Dec. 23, 1958  V. L. PATENAUDE  2,865,028
SEWAGE SYSTEM FOR MOBILE HOMES AND THE LIKE
Filed Oct. 4, 1955  2 Sheets-Sheet 1

Verne L. Patenaude
INVENTOR.

BY
Attorneys

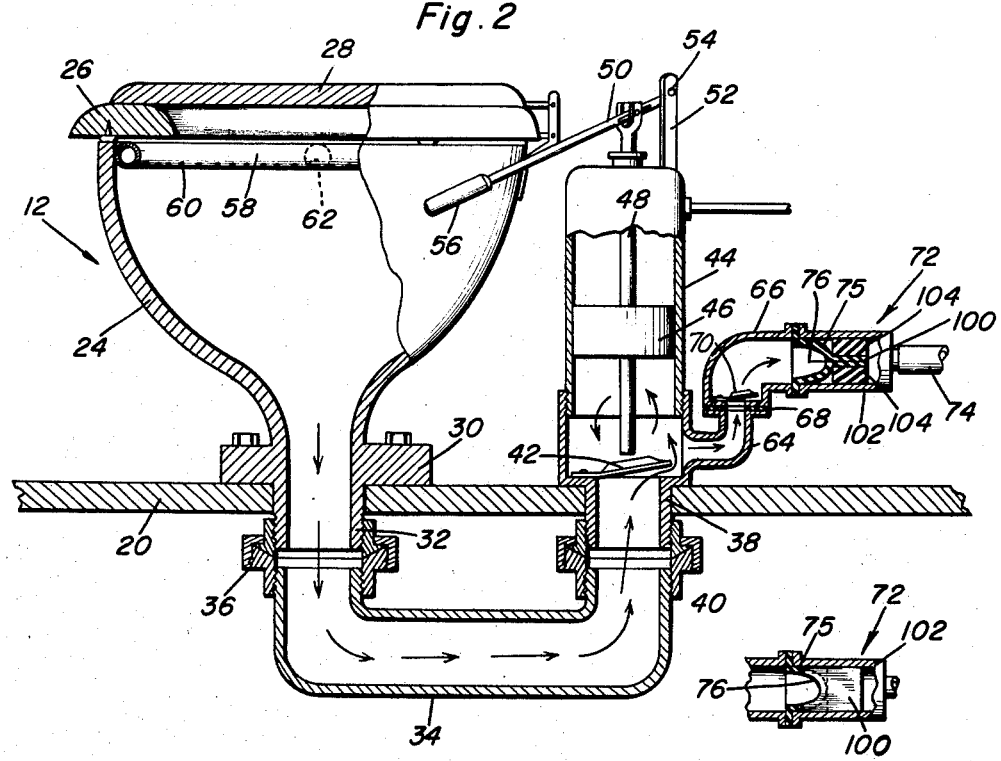
Fig. 2
Fig. 5
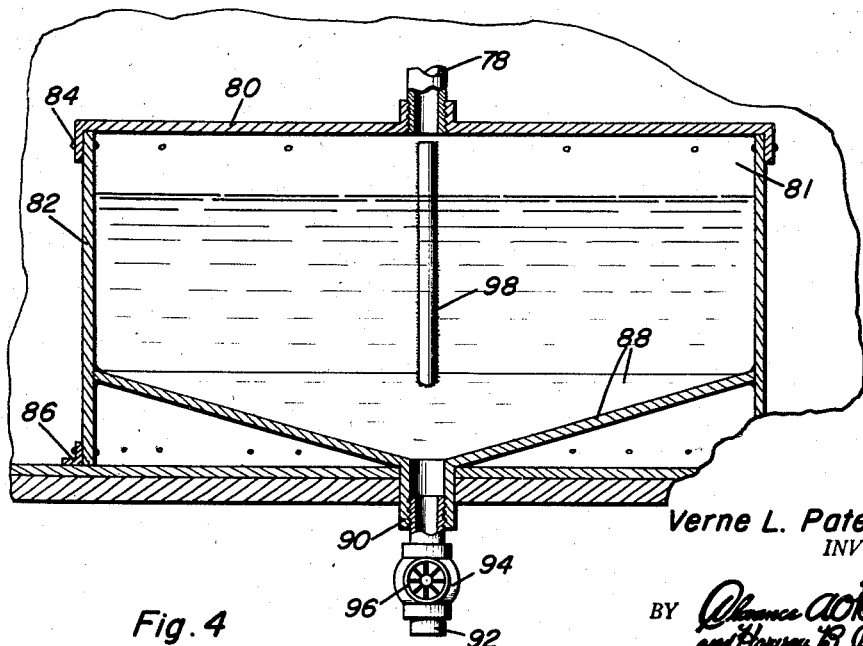
Fig. 4
Verne L. Patenaude
INVENTOR.

United States Patent Office 2,865,028
Patented Dec. 23, 1958

2,865,028
SEWAGE SYSTEM FOR MOBILE HOMES AND THE LIKE

Verne L. Patenaude, Fitchburg, Mass.

Application October 4, 1955, Serial No. 538,391

1 Claim. (Cl. 4—10)

This invention generally relates to new and useful improvements in sewage systems, and more specifically provides a self-contained built-in sewage system especially designed for use in mobile homes, airplanes, busses, railway cars, boats or any other construction including a mobile passenger arrangement wherein the sewage system is self-contained, thereby permitting use of the same at any time.

An object of the present invention is to provide a sanitary sewage system including a flush toilet together with a septic tank which are interconnected by a small pipe together with a soil pump which pumps the sewage into the septic tank, wherein the septic tank is vented for storage of the sewage until the sewage may be disposed of, as by a convenient sewer.

Another object of the present invention is to provide a sanitary sewage system including a pulverizing construction or valve for breaking up the solid portion of the sewage to enhance the liquification of the sewage.

Yet another important object of the present invention is to provide a self-contained sanitary sewage system especially constructed for passenger vehicles, such as mobile trailer homes, wherein the sewage system may be utilized at any time during the travel of the mobile vehicle, regardless of the speed or position of the vehicle.

Other important objects of the present invention reside in its relatively simple construction, adaptation for various purposes, and relatively inexpensive manufacturing, installing and maintaining costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a transverse, detailed sectional view taken substantially upon a plane passing along section line 2—2 of Figure 1 illustrating the details of construction of the flush toilet;

Figure 4 is a sectional view taken upon a plane at right angles to the plane of section of Figure 3 illustrating further structural details of the septic tank; and Figure 5 is a detailed sectional view illustrating further details of the pressure control valve.

Figure 1:
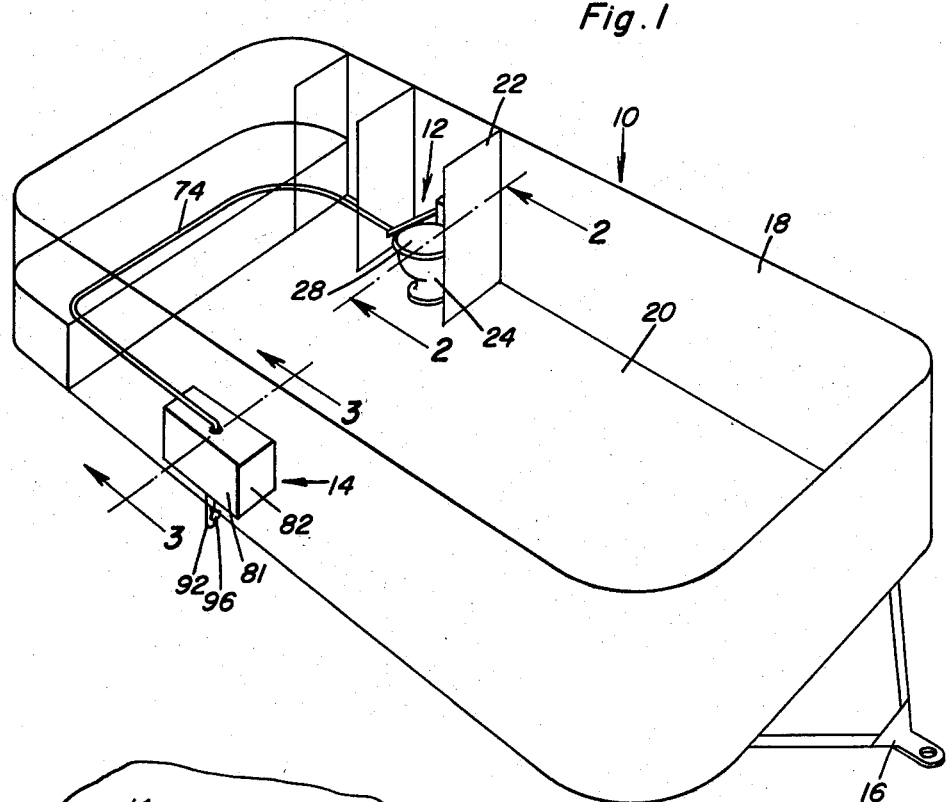
Figure 1 is a schematic view of a trailer home illustrating the sewage system of the present invention installed therein.
Figure 3:
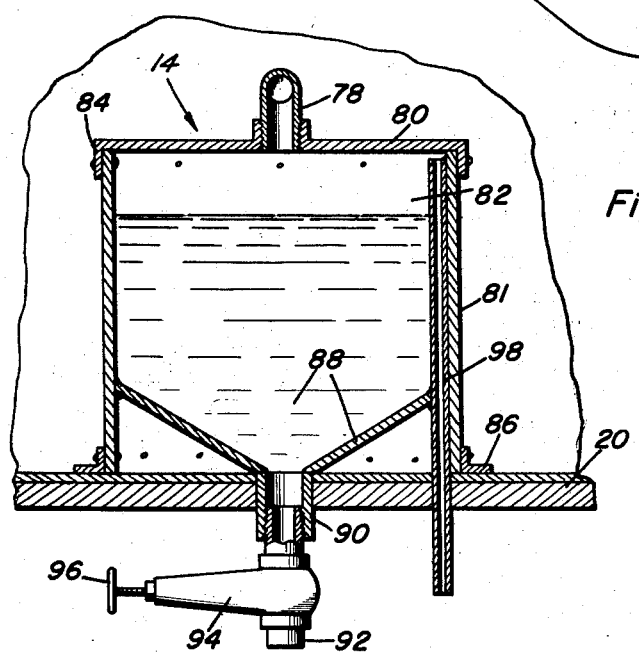
Figure 3 is a detailed sectional view taken substantially upon a plane passing along section line 3—3 of Figure 1 illustrating the construction of the septic tank and the relationship of the vent to the outlet valve.

Referring now specifically to the drawings, the sewage system of the present invention is illustrated as being installed in a house trailer generally designated by the numeral 10. The sewage system includes two units including the flush toilet generally designated by the numeral 12 and the septic tank generally designated by the numeral 14. The house trailer 10 is provided with the usual hitch 16, side walls 18, floor 20 and partitions 22. The flush toilet 12 will be disposed within the house trailer 10 between certain of the partitions 22 which form the bathroom and the septic tank 14 will be disposed remotely therefrom in an area which would be normally unused, such as the area under a bed or under portions of the kitchen or galley.

Referring now specifically to Figure 2, it will be seen that the flush toilet 12 includes a commode or closet bowl 24 having a seat 26 pivotally attached to the open upper end thereof together with a closure cover 28 also pivotally attached thereto, and it will be understood that the toilet 12 is generally of the flushing type. The closet bowl 24 is provided with a flange 30 adjacent the lower end thereof for attachment to the supporting floor 20 of the trailer 10. The lower end of the closet bowl 24 is formed in the nature of a tubular member 32 connected to a discharge pipe 34 by screw threaded connecting means 36. The discharge pipe 34 generally extends horizontally and turns upwardly in spaced relation to the bowl 24 for attachment to the inlet pipe 38 by use of a coupling 40. At the upper end of the inlet pipe 38 is provided a flapper valve 42 in the form of a check valve for a purpose described hereinafter.

Attached to the inlet pipe 38 is a vertically disposed cylinder 44 having a piston 46 mounted therein for reciprocation together with a piston rod 48 extending from the piston 46 outwardly through the upper end of the cylinder 44 for pivotal and slidable attachment to an elongated actuating handle 50 which is terminally and pivotally attached to an upstanding bracket 52 by pivot pin 54 at one end thereof and is provided with a hand grip 56 at the other end thereof wherein pumping action of the handle 50 will reciprocate the piston 46 in the cylinder 44, thereby pumping sewage and water from the commode or closet bowl 24 in a manner described hereinafter. It will be noted that the closet bowl 24 is provided with an annular tubular member 58 adjacent the upper end thereof wherein the tubular member is provided with a plurality of discharge openings 60 for flushing the side walls of the closet bowl 24 and providing water for mixture with solid particles of sewage for liquifying the same. The pipe 58 may be connected to a suitable water supply line 62 or a small quantity of water may be poured directly into the closet bowl 24 for use therein.

The inlet pipe 38 is provided with an outlet portion 64 disposed above the flapper valve 42 which is connected to an elbow 66 by coupling means 68 wherein a flapper check valve 70 is provided in the lower end of the elbow 66, thereby providing a check valve for discharge of the fluid pumped by the piston 46 reciprocating in the cylinder 44.

Inasmuch as the check valves 42 and 70 operate in a conventional manner, it will be understood that when the piston 46 reciprocates, mixed sewage and water is pumped into the bottom portion of the cylinder 44 through the inlet pipe 38 and past the flapper valve 42 wherein the suction caused by the piston 46 will close the flapper valve 70. When the piston 46 descends, the flapper valve 42 will be forced closed and the flapper valve 70 will be forced open for forcing the sewage through a joker valve 72 into a small plastic hose or pipe 74. The joker valve 72 is provided with a generally conical resilient member 75 having transverse slits 76 extending thereacross, wherein the combined solid sewage and water will be constricted as it is forced through the slits 76, thereby thoroughly mixing and liqifying the solid sewage so that it more easily pumps the small plastic hose or pipe 74.

The flexible hose or pipe 74 extends around a portion of the trailer house 10 and is connected by a suitable fitting 78 to the top 80 of the septic tank 14. The septic tank 14 is also provided with two side walls 81, two end walls 82, and the top 80 is provided with depending peripheral flanges 84 for attachment to the side walls 81 and the end walls 82. The side walls 81 as well as the end walls 82 terminate in coplanar relation for attachment to the supporting floor 20 and angle iron reinforcing members 86 are provided for retaining the septic tank 14 in position. A plurality of inclined bottom members 88 are connected to the end and side walls and extend downwardly in converging relation and terminate in a cylindrical discharge opening 90 having a pipe 92 connected thereto in which is inserted a cut-off valve 94 having a control handle 96 thereon wherein the control handle 96 is so disposed for access from the exterior of the trailer home 10 to permit emptying of the septic tank 14. A vent tube 98 extends from a point adjacent the top 80 of the septic tank 14 downwardly through one of the bottom walls 88 and outwardly through the floor 20 so that the septic tank 14 will be vented and in the event overflow occurs, the liquid at the top of the septic tank will drain through the overflow vent 98.

The sewage system operates with a water check or water trap in the flush toilet 12 and the septic tank 14 retains the sewage therein for the usual bacteriological action of the sewage. The joker valve 72 assumes a controlled discharge valve since it resiliently chokes or squeezes the discharged material. In order to enhance this choking action, a lip 100 is formed integrally with each edge of the slit 76 in longitudinal relation with the lips substantially completely filling the center of the valve housing 102. A pair of sponge rubber fillers 104 are provided for disposition between the lips 100 and the periphery of the housing 102 thereby increasing the restriction of the flow of sewage and necessitating the use of increased pressure in forcing the sewage through the valve 72. This increased pressure more effectively breaks up the solid particles of sewage for pulverizing and liquifying the sewage. The septic tank 14 is of a size to permit several weeks' use without emptying, and the tank is constructed of metal or other material compatible with sewage.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In a sewage system, a septic tank, a pressure feed line connected to said tank for conveying sewage thereto, and means in said line for breaking up sewage solids passing through said line and preventing backflow of gases through said line comprising a resilient conical flow restricting member having a transversely slit forward portion and a pair of flat normally engaging resilient lips extending forward from said portion at opposite sides of the slit and together with said slit portion being separative under pressure in said line to restrictively pass sewage therethrough, and a pair of resilient semicircular members in said line at opposite sides of said pair of lips yieldingly resisting the separation of said slit and lips to cause said slit and lips to mash and break up sewage solids passing between said lips, said semi-circular members yieldingly retaining said lips engaged and said slit closed to prevent backflow of gases through said member.

References Cited in the file of this patent

UNITED STATES PATENTS

| | | |
|---|---|---|
| 637,399 | Miles | Nov. 21, 1899 |
| 924,646 | Diem | June 15, 1909 |
| 1,281,974 | Kaeding | Oct. 15, 1918 |
| 1,619,369 | Riegel | Mar. 1, 1927 |
| 2,094,537 | Hinds | Sept. 28, 1937 |
| 2,176,565 | Boynton | Oct. 17, 1939 |
| 2,391,586 | Miller | Dec. 25, 1945 |
| 2,446,571 | Browne | Aug. 10, 1948 |
| 2,662,724 | Kravagna | Dec. 15, 1953 |

FOREIGN PATENTS

| | | |
|---|---|---|
| 719,253 | Germany | Apr. 2, 1942 |